United States Patent [19]

Hovis et al.

[11] Patent Number: 4,842,794

[45] Date of Patent: Jun. 27, 1989

[54] METHOD OF MAKING APERTURED FILMS AND NET LIKE FABRICS

[75] Inventors: Edward E. Hovis, Newark; Eric D. Johnson, Wilmington, both of Del.

[73] Assignee: Applied Extrusion Technologies, Inc., Middletown, Del.

[21] Appl. No.: 79,502

[22] Filed: Jul. 30, 1987

[51] Int. Cl.[4] ................... B29D 28/00; B29C 47/88
[52] U.S. Cl. ..................... 264/145; 264/146; 264/154; 264/235.8; 264/284; 264/DIG. 47; 264/DIG. 70; 264/DIG. 81
[58] Field of Search ............ 264/146, 154, 290.2, 264/DIG. 47, 235.8, 156, 284, 145, 147, 280, 284, 293, 288.8, 234, DIG. 81, DIG. 70

[56] References Cited

U.S. PATENT DOCUMENTS

| | | | |
|---|---|---|---|
| 3,137,746 | 6/1964 | Seymour | 264/290.2 |
| 3,386,876 | 6/1968 | Wyckoff | 264/290.2 |
| 3,387,077 | 6/1968 | Sammons | 264/290.2 |
| 3,441,638 | 4/1969 | Patchell | 264/154 |
| 3,488,415 | 1/1970 | Patchell | 264/290.2 |
| 3,557,268 | 1/1971 | Beretta | 264/146 |
| 3,632,269 | 1/1972 | Doviak | 425/362 |
| 3,642,967 | 2/1972 | Doll | 264/290.2 |
| 3,682,760 | 8/1972 | Fairbanks | 264/290.2 |
| 3,906,073 | 9/1975 | Kim | 264/147 |
| 3,914,365 | 10/1975 | Kim | 264/147 |
| 3,922,329 | 11/1975 | Kim | 264/147 |
| 3,985,600 | 10/1976 | Blais | 264/154 |
| 4,013,752 | 3/1977 | Kalwaites | 264/290.2 |
| 4,075,379 | 2/1978 | Lloyd | 428/105 |
| 4,079,114 | 3/1978 | Bonner | 264/DIG. 47 |
| 4,101,358 | 7/1978 | Kim | 264/290.2 |
| 4,135,023 | 1/1979 | Lloyd | 264/290.2 |
| 4,144,368 | 3/1979 | Kim | 428/105 |
| 4,186,781 | 2/1980 | Kim | 139/420 |
| 4,207,375 | 6/1980 | Kim | 428/286 |
| 4,265,956 | 5/1981 | Colijn | 264/146 |
| 4,274,251 | 6/1981 | Kim | 57/206 |
| 4,280,978 | 7/1981 | Dannheim | 264/154 |
| 4,381,326 | 4/1983 | Kelly | 428/134 |
| 4,426,343 | 1/1984 | Vittone | 264/154 |
| 4,455,337 | 1/1984 | Lloyd | 264/290.2 |
| 4,568,596 | 2/1986 | Johnson | 428/134 |
| 4,629,525 | 12/1986 | Rasmussen | 264/290.2 |

*Primary Examiner*—James Lowe
*Assistant Examiner*—Jeremiah F. Durkin, II
*Attorney, Agent, or Firm*—Connolly & Hutz

[57] ABSTRACT

A method of making apertured films including the step of perforating films of thermoplastic materials with embossing rolls engraved with patterns which form small slits or incipient slits in the sheet. The patterns are such that the design on the roll includes lands, or raised areas, which cross lands of the opposing roll at an acute angle. The perforated or partially perforated film formed may then be further processed by orientation, uniaxial or biaxial, simultaneous or sequential; by heat treatment; or both to modify the porosity, hole size, or other properties as desired.

23 Claims, 3 Drawing Sheets

METHOD OF MAKING APERTURED FILMS AND NET LIKE FABRICS

FIELD OF THE INVENTION

This invention relates to a process of preparing an apertured film and to the film so prepared. More particularly, this invention relates to a process of embossing an extruded film on one side with a pattern of parallel grooves, and on the other side with a pattern of parallel grooves which form an acute angle with the grooves embossed on the first side, which forms slits or incipient slits in the film where the grooves cross each other.

The size and shape of these slits may then be modified by uniaxial orientation, sequential or simultaneous biaxial orientation, or heat treatment. The surface of the apertured film may be modified by embossing micro or macro patterns thereon to improve the visual aesthetics of the film and make it appear fabric like.

BACKGROUND OF THE INVENTION

It is well known to prepare network structures from embossed thermoplastic film and then sequentially stretching, biaxially or uniaxially. For example, U.S. Pat. No. 3,914,365 to Kim and Liu teaches a process of forming numerous parallel main ribs in one direction on one side of a sheet and a greater number of parallel tie ribs in a second direction on the other side of a sheet, the ribs forming a pattern of thick and thin areas in the sheet, then subsequently orienting the patterned film to open the sheet into the network structure. U.S. Pat. No. 3,488,415 to Patchell, et al, teaches a process for making a fabric from plastic material by providing both sides of a continuous sheet of plastic material with grooves which extend partly through the sheet, the grooves on one surface being arranged to cross the grooves on the other surface, the crossing points having only the reduced thickness of material which separates the bases of the grooves. The sheet is then biaxially stretched so that the thinned parts of the sheet split and form perforations at the slits.

Numerous other U.S. Pat. Nos. 4,075,379, 3,922,327, 4,207,375, 4,186,781 and 4,274,251 disclose improvements and/or modifications to the basic practice. The preferred orientation of lines or grooves is at 90° to each other. In all cases, however, the embossed, patterned film is not porous until it is oriented. Furthermore, although not specifically stated in many of the patents, this process has been limited to high density polyethylene, polypropylene homopolymer, polypropylene copolymers, and polymer blends where aforementioned polymers are the major component. When these processes are implemented with soft, non-crystalline polymers, such as low density polyethylene apertures are not formed; a patterned closed film is produced.

SUMMARY OF THE INVENTION

It has unexpectedly and surprisingly been discovered that by following certain parameters an apertured film can be created by properly embossing a thermoplastic film. Moreover the thermoplastic film is no longer limited to aforementioned crystalline polymers, but may be comprised of low density or very low density polyethylenes, linear low density polyethylenes, polypropylene homopolymers, copolymers and terpolymers, polybutene, thermoplastic rubbers, ethylene copolymers such as EVA, SURLYN ®, EMA or EEA, polyurethanes, and polyether block amides among others or blends of the same. Films may be pigmented or not, and may contain fillers and additives commonly used in the industry such as $TiO_2$, $CaCO_3$, slip, and antiblock additives, etc.

These new apertured films are capable of having a much broader range of finished product physical properties such as melting point, softness, tensile elongation, etc. that enhance their usefulness. Accordingly this invention relates to the process of preparing an apertured film comprising the steps of a. extruding a thermoplastic polymer into a film or sheet of between 0.5 and 20 mils thickness; and b. providing the thus extruded molten film of polymer, on one surface, with from about 10 to 150, most preferably from about 30 to 80 grooves per inch and on the other surface, with from about 10 to 150, most preferably 30 to 80, grooves per inch; the set of grooves on the first surface crossing the set of grooves on the second surface at an acute angle of between 15° and 75°, most preferably at 45°, by passing the molten extruded film into the nip formed by two embossing rolls, having engraved lines, at a pressure of from about 10 to about 300 pounds per linear inch, the lines being parallel linear cavities being arranged with space between adjacent lines, the lines being oriented in any direction with the restriction that the lines on one roller must form an acute angle with the lines engraved on the other roller when said rollers are brought into contact and rotated.

The apertured film produced may be further processed as follows:

a. the film may be uniaxially oriented in either the machine or cross machine direction from about 50 to 500%;

b. the film may be sequentially biaxially oriented
  1. first in the machine direction from about 5 to about 50%;
  2. then in the cross machine direction from about 5 to 600%;
  3. finally in the machine direction from about 0 to 600%;

c. the film may be heat treated while restrained close to the melting point of the thermoplastic polymer comprising the film such that the stresses near the holes cause the film to shrink increasing the size of the hole;

d. the net like structure may be heat treated as in step c after an orientation step as described in steps a or b.

Net like structures produced by these procedures may be further processed by a. imparting a micro-matte finish by using embossing rollers with micro-matte finishes;

b. imparting a macro texture to the structure by heating it to a temperature below its melting point, but high enough to enable the structure to be deformed easily, and passing the structure into the nip formed by a heated texturizing roller and a cooled resilient roller at a pressure of from about 60 to about 120 pounds per linear inch, said texturizing roller having from 20 to about 3,000 pins per square inch protruding from its surface, the pins being arranged in a pattern which approximates a random pin placement; obviously other macro texturizing patterns may be used to change the surface appearance of the fabric; or c. imparting a micro matte and macro texture simultaneously.

THE DRAWINGS

DETAILED DESCRIPTION

Figure 1A:
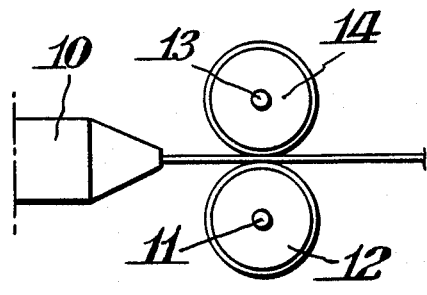
FIG. 1A is a diagrammatic side elevation view of an arrangement for forming the grooves and slits in the thermoplastic sheet in accordance with this invention.
Figure 1B:
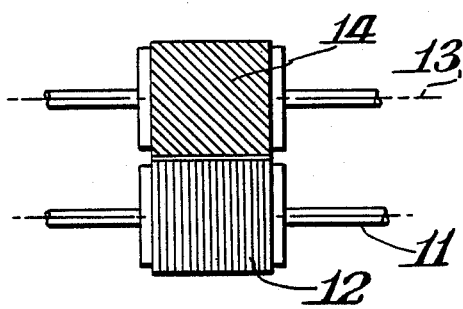
FIG. 1B is a front elevation view of FIG. 1A.

FIGS. 1A and 1B show a simplified diagrammatic elevation of the method of embossing the film. The molten polymer is extruded from a commercial film die 10 into the nip formed by two embossing rollers 12 and 14 engraved with patterns 1 and 2 as described in FIGS. 2 and 3 or other more complex patterns. During the embossing operations the lands of the roll's engraved patterns cross each other at an acute angle and cause a slit to be formed in the film. This slit will be somewhat ragged and may have strands of polymer crossing said slits but the film will exhibit porosity as measured by a Frazier or Gurley Air Permeability Machine.

Figure 2A:
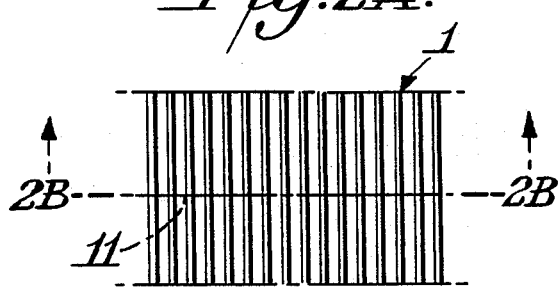
FIG. 2A is an enlarged plan view of a typical engraving pattern for embossing one side of the thermoplastic film from the arrangement of FIGS. 1A-1B.

FIG. 2A is an enlarged plan view of a typical, most simple engraving pattern useful in the process of this invention. The engraving pattern 1, in this instance, is a multiplicity of straight parallel lines, 75 per inch running in the machine direction, i.e. annularly on the engraved roller, perpendicular to roll axis 11.

Figure 2B:
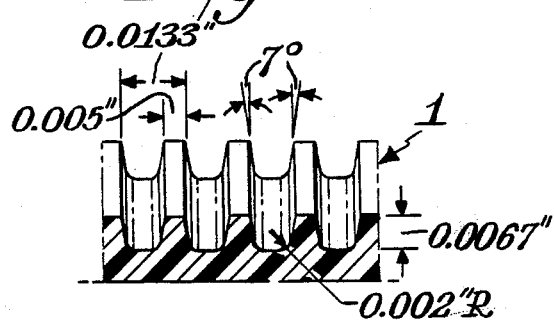
FIG. 2B is an enlarged diagrammatic perspective section view of the engraving in FIG. 2A taken along the line 2B—2B.

FIG. 2B is an enlarged section view of the engraving of FIG. 2A. The lines are an alternating series of linear ridges and valleys annularly engraved on the roller 12. The tops of the ridges, called lands, form the bottoms of the grooves in the thermoplastic film. The valleys form ribs in the thermoplastic film. For the purposes of this invention, the configuration of the land is the most important feature of the pattern. In this particular illustration the land width is 5 mils and the valley is 8 mils wide. The valley is approximately 6.7 mils deep. The absolute value of these dimensions, or ratios of these dimensions are not critical parameters to this invention. However, the consistency of the shapes and dimensions is critical since they change the configuration of the apertures as they change, thus changing the properties of the product.

Figure 3A:
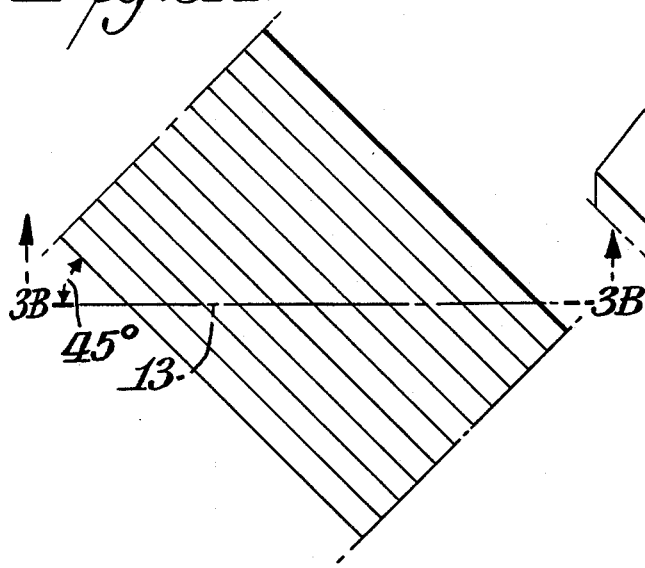
FIG. 3A is an enlarged plan view of a typical engraving pattern for embossing the other side of the thermoplastic film from the arrangement of FIGS 1A-1B.

FIG. 3A is an enlarged plan view of a typical most simple engraving pattern 2 useful in the process of this invention in conjunction with the engraving pattern described in FIG. 2A and B. This engraving pattern is a multiplicity of straight parallel lines, 74 per inch running at an angle of 45° to the machine direction.

Figure 3B:
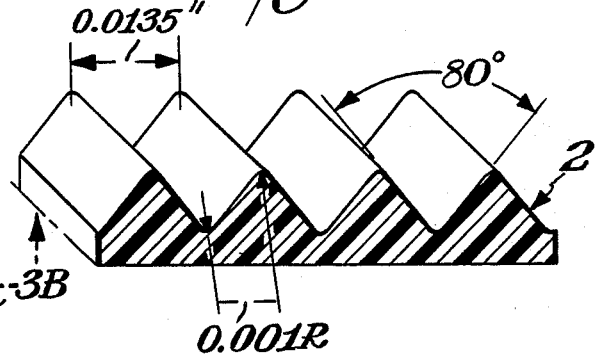
FIG. 3B is an enlarged diagrammatic perspective section view of the engraving in FIG. 3A taken along the line 3B—3B.

FIG. 3B is an enlarged section view of the engraving pattern of FIG. 3A. The lines are an alternating series of ridges and valleys engraved at a 45° angle to true axial line 13 on the roller 14. The land width on this roll is very narrow less than 1 mil, with very wide valleys, about 12 mils. Again the absolute value of these dimensions is not critical in making the process work, but is very critical to the properties of the product made.

The dimensions indicated in FIGS. 2B and 3B are merely illustrative of one practice of the invention.

Figure 4:
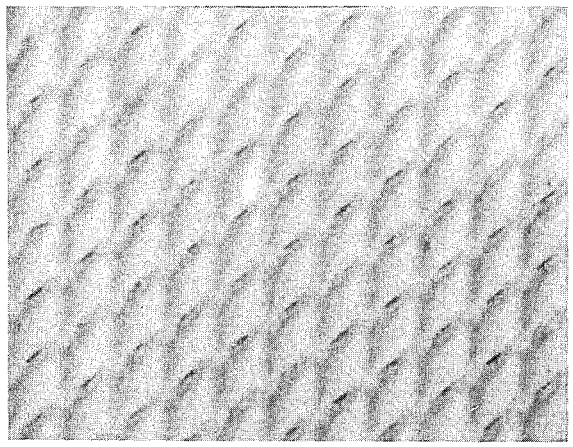
FIG. 4 is an microphotograph of a top plan view of the apertured film with slits produced by the embossing rolls in FIGS. 1A and 1B.

FIG. 4 is a photomicrograph of a very low density polyethylene film cast and embossed by the process of this invention. The film shows an air permeability of 9.2 ft$^3$/min per ft$^2$ of surface area. The ribs formed in the film are very evident as is the slit formed by the land crossovers.

Figure 5:
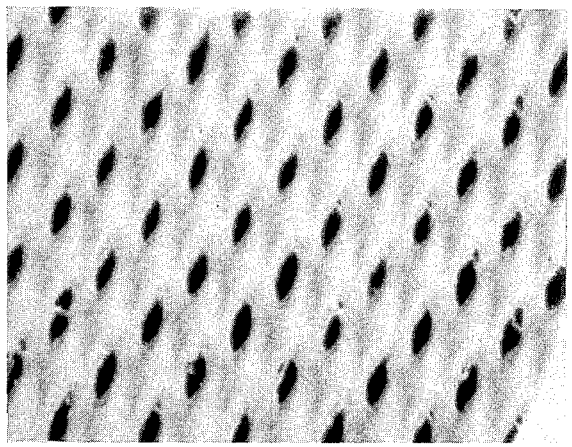
FIG. 5 is a microphotograph of an apertured film after it has been uniaxially oriented.

FIG. 5 is a microphotograph of a similar very low density polyethylene film as shown in FIG. 4 after it has been oriented in the machine direction about 100%. The net like structure exhibits an air porosity of 220 ft$^3$/min per square foot of surface area. As can be seen the slits have become elongated and much larger than in FIG. 4. At the same time, the ribs have become much less pronounced.

Figure 6:
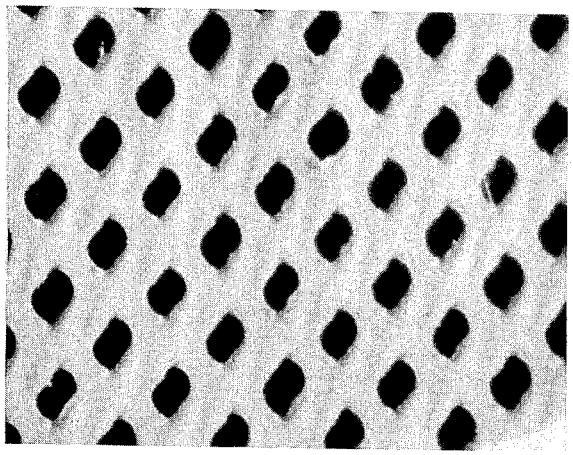
FIG. 6 is a microphotograph of the apertured film of FIG. 4 after it has been biaxially oriented, to form a net like structure.

FIG. 6 is a microphotograph of a similar very low density polyethylene film to that shown in FIG. 4 after it has been sequentially biaxially oriented. The net like structure exhibits an air permeability of approximately 800 ft$^3$/min per square foot of fabric. The holes are oval shaped, exhibiting an increase in length of the minor semi-axis over the holes shown in FIG. 5.

Figure 7:
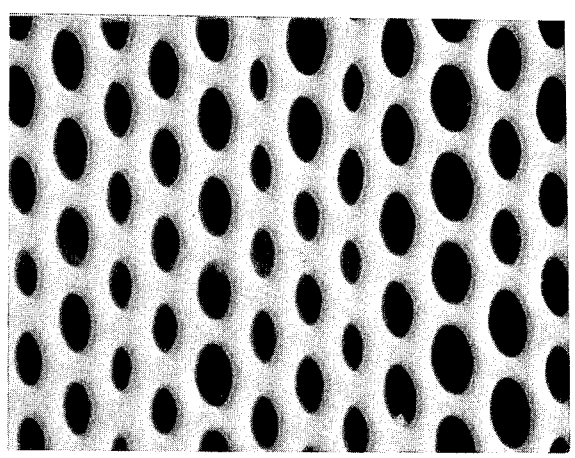
FIG. 7 is a microphotograph of the apertured film of FIGS. 4 after it has been heat treated.

FIG. 7 is a microphotograph of an apertured film of a blend containing a major component of very low density polyethylene and a minor component of high density polyethylene similar to that shown in FIG. 4. After casting and embossing the film was subjected to air heated to 117° C. while the film was restrained from shrinking in both the machine and cross machine directions. As is evident from the photograph, although the overall dimensions of the film were prevented from shrinking, the film immediately surrounding the slits shrank causing the slits to form oval shaped holes similar to those shown in FIG. 6.

Figure 8A:
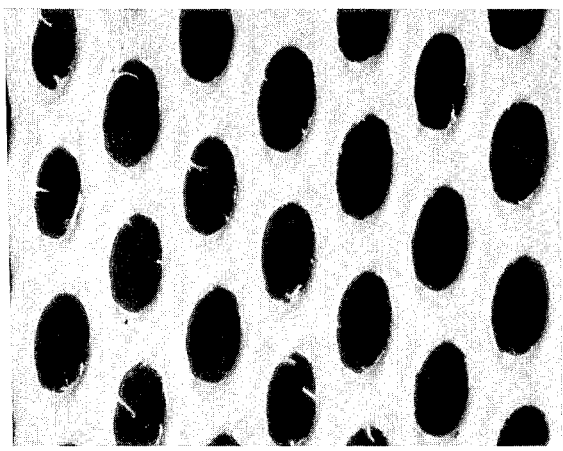
FIG. 8A and 8B are microphotographs of net like structures before and after micro texturizing, respectively.
Figure 8B:
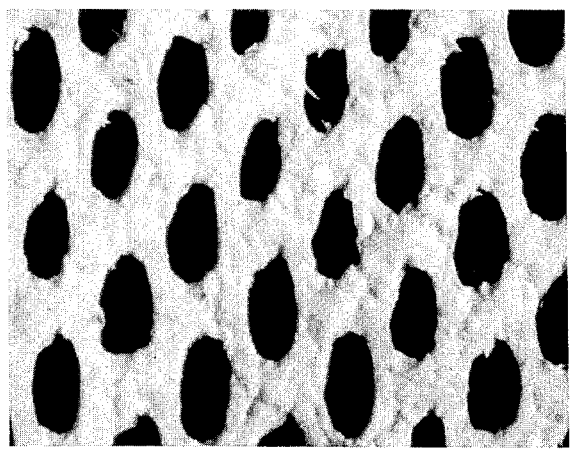

FIGS. 8A and 8B are microphotographs of a polypropylene copolymer biaxially oriented net like structure, before and after a micro texturizing operation has taken place. This micro texturizing consist of running the net like structure against a roll, plate, die or mold which has a pattern, the pattern being so fine that it is not readily apparent to the naked eye, however being sufficient to be apparent under magnification of 10 to 25X. The purpose of the micro texture is to roughen the surface of the structure and hence reduce the reflectivity of light; making the structure appear to be more fabric like and less plastic.

FIG. 8A shows the net like structure before micro texturizing.

FIG. 8B shows the same net like structure after micro texturizing.

Figure 9A:
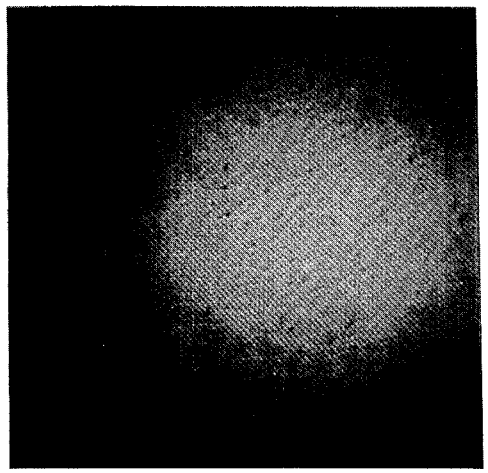
FIGS. 9A and 9B are photographs of a net like structure before and after macro texturizing, respectively.
Figure 9B:
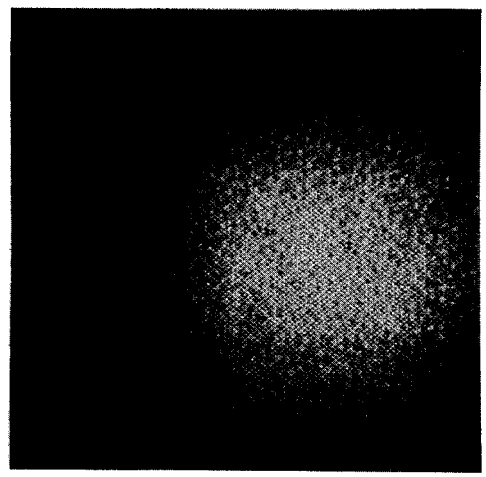

FIGS. 9A and 9B show photographs of a polypropylene copolymer net like structure manufactured according to the processes of this invention before and after macro texturizing. The macro texturization serves to visually break up the regular pattern of holes by situating them in various planes in space. The texturizing decreases the reflectivity of the net and makes the film appear more fabric like and less like a plastic film.

FIG. 9A shows the net like structure before texturizing.

FIG. 9B shows the same structure after texturizing.

As indicated above, certain specific parameters must be followed in order to obtain the novel apertured film and net like fabrics of the invention.

The most important parameter is the design of the engraving patterns used on the polymer film embossing rolls. The critical element of this design is the shearing action caused by the edge of the land of one of the patterns as it crosses the land of the other pattern at an acute angle. The extruded film, while still molten is passed into the nip formed by two opposing rollers. The rollers are temperature controlled at temperatures below the melting point of the thermoplastic polymer being cast. The rollers will generally have a metal surface and exert a pressure of from 10 to 300 lbs. per linear inch of roll surface in contact with the film. The upper limit of pressures being more a function of the durability of the rolls rather than a requirement of the process. The lower embossing limit is a function of the properties of the polymer and engraving in use. The design of the pattern on these rolls can be varied, most commonly being a series of lines as described in FIGS. 1 and 2, although any combination of lines and or geometric shapes can be used if the edges of the raised areas, called lands cross the lands engraved on the opposing roller at an acute angle, of about 15° to 75°, most preferably of between 30° and 60°. Additionally, the ratio of the count of the lands between the patterns engraved on the two rollers needs to be between 0.25 and 1.0. Although the lines shown herein have been straight this is not a requirement of the process. Additionally geometric shapes, such as the rhomboid commonly known as a diamond, or others are useful in the process of this invention.

The invention is applicable to a wide range of thermoplastic polymers. In particular films have been cast and embossed from high density polyethylene, low density polyethylene, linear low density polyethylene, very low density polyethylene, polypropylene homopolymer, polypropylene ethylene copolymers, polypropylene ethylene butene terpolymers, polybutene, polyurethane, thermoplastic rubbers such as SANTOPRENE ® and KRATON ®, ethylene copolymers such as EVA, SURLYN ® EMA or EEA, and polyether block amides such as PEBAX ®. Blends of the above polymers with each other and other polymers, such as polystyrene, perform as described in this invention. Common pigments and additives can be incorporated into the film as desired. In particular, TiO$_2$ and CaCO$_3$ have been incorporated into the film at levels as high as 15% to act as opacifiers and colorants. Slip, antiblock, antistatic, chill roll release, and surfactant additives commonly used in the manufacture of thermoplastic polymer films have also been incorporated as desired. The polymers, polymer blends, pigments and additives may be blended in any conventional manner as will be obvious to one skilled in the art. The polymer will be extruded through conventional, commercially available extrusion equipment, through a standard film or sheet die into a molten polymer film of between 0.5 and 20 mils thickness. The molten polymer film shall then be fed into the nip of two embossing rollers as described previously.

In certain instances, it may be advantageous to coextrude two or more polymers into discrete layers within the molten film to feed into the nip thus obtaining apertured films with different properties from surface to surface.

The apertured film obtained from the nip will exhibit porosity, depending upon the size of the slits imparted, but usually less than 10 ft$^3$/min/ft$^2$. When rollers are worn or poorly matched, up to 75% of the area of the film may be produced with partial or sometimes even total obstructions of the slits, however the obstructions are so thin they can be broken easily by stressing the film.

The apertured film may be further processed according to established processes known to those in the art. Specifically the film may be oriented biaxially or uniaxially on conventional, commercially available stretching equipment.

Alternatively, the film may be heat treated by restraining the film so that its physical dimensions, length and width, are held constant or slightly, less than 20%, increased or diminished, while subjecting the film to a temperature approaching its melting point. The heat treatment causes that area of the film immediately adjacent to the slits, or incipient slits, to shrink back, thus enlarging the hole. The heat treatment may be accomplished on commercially available equipment such as a heat setting tenter or other equipment which may be convenient.

The film may also be processed by any combination of methods as described above.

The films, either as cast or after further processing as described above, may be modified even further by micro or macro texturizing.

Micro texturizing refers to a process of imparting irregularities, which could be depressions, bumps, lines, etc., which are invisible to the naked eye but which change the reflectance of incident light from the surface of the film or structure. The irregularities are readily apparent at magnifications over 25×X. Micro texturizing is most readily accomplished by heating the film or structure to a temperature sufficient to render the base thermoplastic of the film or structures readily deformable, then compressing the heated thermoplastic film or structure with a micro patterned tool. Most commonly such tool would be a steel roller which would form a nip with another roller, which could be metallic and hard, or provide a resilient surface such as a rubber or rubber-like material.

Macro texturizing refers to a process of creating surface changes which are readily apparent to the naked eye. Most commonly the surface is deformed by a series of pins as described in U.S. Pat. No. 4,568,596 issued to co-applicant Johnson. The pins are most commonly engraved on a steel roller. The film or structure is most commonly deformed by processing said film or structure through a nip formed by the pin engraved steel roller and a resilient roller.

As should be obvious to one skilled in the art, the micro and macro texturizing may be accomplished simultaneously by using a roller suitably engraved with both said micro and macro texture, in fact simultaneous texturizing is preferable to sequential since the last texturizing operation tends to diminish the properties imparted previously.

EXAMPLE 1

A very low density polyethylene resin, DGM 9950 made by Union Carbide, was cast at approximately 230° C. extruder temperature. Resin contained 15% by weight of a white color concentrate made from 50% LDPE and 50% $TiO_2$.

The film was approximately 4 mils thick.

The film was nipped while still molten between rolls engraved as shown in FIG. 2 and FIG. 3. The roll of FIG. 2 was temperature controlled at 80° F. while the roll of FIG. 3 was controlled at 100° F. The rolls were nipped at 125 pli. The apertured film produced had an air permeability of 9 $ft^3/min/ft^2$.

The thus apertured film was then stretched 90% in the machine direction at 70° C. The net like structure produced had an air permeability of 220 $ft^3/min/ft^2$.

EXAMPLE 2

A polypropylene terpolymer, Himont Moplen EP 3C30F was blended with 15% of the same white color concentrate used in Example 1(50% $TiO_2$) and extruded into a film about 3 mil thick. The film was cast into the nip of rollers engraved with a 40 lines per inch pattern annular and 35 lines per inch at 33° to axial, for an included angle of 67°. Film exhibited an air permeability of 0.12 $ft^3/min/ft^2$. Film was subsequently stretched 400% in the machine direction. Net like structure then had an air permeability of 492 $ft^3/min/ft^2$ and an average thickness of 0.9 mils.

What is claimed is:

1. A process for the preparation of an apertured thermoplastic film comprising the steps of (a) extruding a molten thermoplastic polymer film between 0.5 and 20 mils thick; and (b) providing the extruded molten polymer film with a multiplicity of small slits by passing the film through the nip of two rollers engraved with patterns containing edges of lands such that the edges cross each other such that the angle formed by the crossing edges is between 15° and 75° with the slits being formed by the edges of the lands at their intersections cutting through the film and with the slits being arranged in patterns having from 10 to 150 slits per inch.

2. The process of claim 1 wherein the edges of the lands cross each other at an angle between 30° and 60°.

3. The process of claim 1 wherein the edges of the lands cross each other at an angle of 45°.

4. The process of claim 1 including the step of (c) enlarging the slits to form holes of the apertured film to create a net like structure.

5. The process of claim 4 where step (c) is uniaxially orienting the apertured film from 0 to 500%.

6. The process of claim 4 where step (c) is sequential biaxial oriention of the structure by stretching in the machine direction from 0% to 600%; then stretching in the cross machine direction from 0% to 600% and then stretching in the machine direction from 0% to 600%.

7. The process of claim 4 where step (c) is simultaneous biaxial orientation of the apertured film from 0% to 600% in both directions.

8. The process of claim 4 where step (c) is heat treating the apertured film by restraining the film in both the machine and cross directions to create dimensional changes of less than 20%, and heating the apertured film sufficiently close to its melting point such that oval holes are formed in the structure.

9. The process of claim 4 where step (c) is a combination of uniaxially orienting the film from 0% to 500% followed by heat treatment of the film by restraining the film in both the machine and cross directions to create dimensional changes of less than 20%, and heating the film sufficiently close to its melting point such that oval holes are formed.

10. The process of claim 4 where step (c) is a combination of sequentially biaxially orienting the film - followed by heat treatment of the film.

11. The process of claim 4 where step (c) is a combination of simultaneous biaxial orientation followed by heat treatment.

12. The process of claim 4 including the step of micro texturizing the net like structure.

13. The process of claim 4 including the step of macro texturizing the net like structure.

14. The process of claim 1 wherein the apertured thermoplastic film is selected from the group consisting of high density polyethylene (HDPE), polymer blends in which high density polyethylene is the major component, high density polyethylene and HDPE blends containing pigments, fillers, or additives.

15. The process of claim 4 wherein the apertured thermoplastic film is selected from the group consisting of high density polyethylene (HDPE), polymer blends in which high density polyethylene is the major component, high density polyethylene and HDPE blends containing pigments, fillers, or additives.

16. The process of claim 1 wherein the apertured thermoplastic film is selected from the group consisting of polypropylene homopolymers, copolymers or terpolymers or blends of polymers in which the major component is polypropylene homopolymer, copolymer, or terpolymer or the above metioned polymers and polymer blends containing pigments, fillers or additives.

17. The process of claim 4 wherein the apertured thermoplastic film is selected from the group consisting of polypropylene homopolymers, copolymers or terpolymers or blends of polymers in which the major component is polypropylene homopolymer, copolymer, or terpolymer or the above mentioned polymers and polymer blends containing pigments, fillers or additives.

18. The process of claim 1 wherein the apertured thermoplastic film is selected from the group consisting of low or medium density polyethylene, linear low density polyethylene, very low density polyethylene or blends of polymers in which the major component is LDPE, MDPE, LLDPE or VLDPE or the above mentioned polymers and polymer blends containing pigments, fillers or additives.

19. The process of claim 4 wherein the apertured thermoplastic film is selected from the group consisting of low or medium density polyethylene, linear low density polyethylene, very low density polyethylene or blends of polymers in which the major component is LDPE, MDPE, LLDPE or VLDPE or the above mentioned polymers and polymer blends containing pigments, fillers or additives.

20. The process of claim 1 wherein the apertured thermoplastic film is selected from the group consisting of ethylene copolymers including EVA, EEA, EMA, and an ionomer resin or polymer blends containing one or more ethylene copolymers as the major constituent or the above mentioned polymers and polymer blends containing pigments, fillers, or additives.

21. The process of claim 4 wherein the apertured thermoplastic film is selected from the group consisting of ethylene copolymers including EVA, EEA, EMA, an ionomer resin or polymer blends containing one or more ethylene copolymers as the major constituent or the above mentioned polymers and polymer blends containing pigments, fillers, or additives.

22. The process of claim 1 wherein the apertured thermoplastic film is selected from the group consisting of polyurethane, thermoplastic elastomer, polyether block amide, polybutene, polyester, and polyamide or polymer blends containing one or more of these polymers as the major constituent or the above mentioned polymers and polymer blends containing pigments, fillers, or additives.

23. The process of claim 4 wherein the apertured thermoplastic film is selected from the group consisting of polyurethane, thermoplastic elastomer, polyether block amide, polybutene, polyester, and polyamide blends containing one or more of these polymers as the major constituent or the above mentioned polymers and polymer blends containing pigments, fillers, or additives.

* * * * *